(12) United States Patent
Sauvignet et al.

(10) Patent No.: US 9,957,182 B2
(45) Date of Patent: May 1, 2018

(54) METHOD FOR TREATING WATER CONTAINING ORGANIC MATTER USING ION EXCHANGE AND BALLASTED FLOCCULATION

(71) Applicant: Veolia Water Solutions & Technologies Support, Saint-Maurice (FR)

(72) Inventors: Philippe Sauvignet, Saint-Etienne en Cogles (FR); Abdelkader Gaid, Paris (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 267 days.

(21) Appl. No.: 14/959,711

(22) Filed: Dec. 4, 2015

(65) Prior Publication Data
US 2016/0167998 A1    Jun. 16, 2016

(30) Foreign Application Priority Data

May 12, 2015   (FR) ...................................... 14 62014

(51) Int. Cl.
*C02F 1/42* (2006.01)
*C02F 1/52* (2006.01)
(Continued)

(52) U.S. Cl.
CPC ............ *C02F 9/00* (2013.01); *B01D 21/0084* (2013.01); *B01D 21/01* (2013.01); *B01J 47/10* (2013.01);
(Continued)

(58) Field of Classification Search
CPC .......... C02F 9/00; C02F 1/5281; C02F 1/004; C02F 1/24; C02F 1/42; C02F 2305/12;
(Continued)

(56) References Cited

U.S. PATENT DOCUMENTS 7,323,108 B1 *   1/2008   Garbett .................... C02F 9/00
                                                            210/607

FOREIGN PATENT DOCUMENTS

JP          62183810 A   *   8/1987
JP        2014000510 A   *   1/2014

OTHER PUBLICATIONS

Machine Translation of JP2014000510A (Naotomo) Jan. 2014 [online], [retrieved on Mar. 13, 2018] Retrieved from the J-Plat Pat website  <URL:  https://www.j-platpat.inpit.go.jp/web/all/top/BTmTopEnglishPage>.*

(Continued)

*Primary Examiner* — Matthew O Savage
(74) *Attorney, Agent, or Firm* — Coats & Bennett, PLLC

(57) ABSTRACT

Method for treating water, containing organic matter characterized in that it comprises a step of adsorption of the organic matter contained in said water, in which this water is put into contact with an amagnetic ion-exchanging resin in an infinitely stirred tank (1); the filtering of the mixture of water and resin within the tank (1) and the discharging of filtered water from this tank, the filtering being implemented through at least one screen (4) provided within the tank (1) enabling the resin to be contained in the infinitely stirred tank; the periodic cleansing of the screen (4) consisting of the separation, from this screen, of the saturated resin that has collected thereon; the drawing off (18) of saturated resin from the tank (1); the regenerating (6) of at least a part of the saturated resin thus drawn off; the recycling (7) of said resin thus regenerated in the tank (1); a step of ballasted coagulation/flocculation (12, 13) and separation (14) comprising the addition of coagulant reagent (12*b*), flocculent reagent (13*b*) and microballast (21) to the filtered water coming from the tank (1) leading to the formation of flocs; the separation of the formed flocs from a clarified water (16); and the discharging (16) of the clarified water; and the (Continued)

discharging (17) of the sludges formed by the separated flocs.

11 Claims, 2 Drawing Sheets

(51) Int. Cl.
| | |
|---|---|
| *C02F 9/00* | (2006.01) |
| *B01J 47/10* | (2017.01) |
| *C02F 1/24* | (2006.01) |
| *B01D 21/00* | (2006.01) |
| *B01D 21/01* | (2006.01) |
| *G01M 15/14* | (2006.01) |
| *C02F 1/56* | (2006.01) |
| *C02F 1/00* | (2006.01) |
| *C02F 101/30* | (2006.01) |

(52) U.S. Cl.
CPC ............... *C02F 1/004* (2013.01); *C02F 1/24* (2013.01); *C02F 1/42* (2013.01); *C02F 1/5281* (2013.01); *G01M 15/14* (2013.01); *C02F 1/5245* (2013.01); *C02F 1/56* (2013.01); *C02F 2001/007* (2013.01); *C02F 2001/422* (2013.01); *C02F 2101/30* (2013.01); *C02F 2303/16* (2013.01); *C02F 2305/12* (2013.01)

(58) Field of Classification Search
CPC .... C02F 1/5245; C02F 1/56; C02F 2001/007; C02F 2001/422; C02F 2101/30; C02F 2303/16; C02F 1/008; C02F 2209/20; C02F 2209/21; B01D 21/01; B01D 21/0084
See application file for complete search history.

(56) References Cited

OTHER PUBLICATIONS

Machine Translation of JP62183810A (Takahashi) Aug. 1987 [online], [retrieived on Mar. 13, 2018] Retrieved from the J-Plat Pat webside <https://www.j-platpat.inpit.go.jp/web/all/top/BTmTopEnglishPage>.*

* cited by examiner

METHOD FOR TREATING WATER CONTAINING ORGANIC MATTER USING ION EXCHANGE AND BALLASTED FLOCCULATION

Applicant claims priority based on French Patent Application No. 1562014 filed May 12, 2014. The subject matter of this application is incorporated herein.

FIELD OF THE INVENTION

The invention relates to the field of the treatment of water with a view to reducing its organic matter content, suspended matter content and turbidity as well as its color.

More specifically, the invention relates to the treatment of such water by physical/chemical means.

The invention can be applied to:
water recycled from wastewater for various uses,
the treatment of industrial process water (such as for example specific water used for the microelectronics industry, etc.),
the treatment of water bodies into which organic matter has infiltrated,
the potabilization of water.

The invention can be applied very particularly in methods for the desalination of seawater or brackish water or the treatment of surface water with a high variation of algae concentration. Indeed, the present invention is particularly efficient in eliminating the algae contained in water to be treated.

PRIOR ART

Various physical/chemical methods for lowering the content in organic matter in water are known to those skilled in the art.

Many of these methods entail the use of chemical, coagulant and/or flocculent reagents which enable the aggregation of this matter to facilitate its ultimate separation from water. These methods require working with high doses in chemical reagents in acid media (pH 5-6). With such methods, it is thus possible to eliminate 50% to 65% of the organic matter.

The main drawback of such methods lies in their high consumption of chemical reagents. For example, to eliminate 50% to 65% of organic matter from water containing 10 mg/l and 14 mg/l (expressed in dissolved organic carbon), it is necessary to have 170 g/m$^3$ to 220 g/m$^3$ of coagulant reagent ($FeCl_3$), to which 30 to 100 g/m$^3$ of acid must be added in order to maintain the pH between 5 and 6, if the water is buffered.

These reagents have relatively high costs which impact non-negligibly on the costs of the methods implementing them.

The high consumption of these reagents also leads to the production of large quantities of sludges. Now these sludges require treatment aimed, at the very least, at sanitizing and stabilizing them but also generally at reducing their volume. The greater the quantities of sludges produced, the greater therefore is the size of the plants needed to process them, and this implies an increase in their cost.

Besides, the agricultural recycling of sludges implies the addition thereto of quantities of lime which correspondingly increase the volume of the sludges and therefore the cost of their treatment.

Secondly, the acid conditions in which these reagents are applied result in the water produced being aggressive and corrosive. This water has to be neutralized by the addition of further chemical reagents. This further increases the quantities of sludges produced and the costs of treatment. Before its neutralization, this acid water is moreover corrosive enough to accelerate the ageing of the equipment in which it travels.

Other physical/chemical methods to reduce the organic matter content of water implement adsorbent materials such as for example carbon-active powder on which the organic matter gets fixed.

The performance levels of such methods are high but, here again, their drawback lies in the high consumption of adsorbent material that they entail. For example, to eliminate 50% to 60% of the organic matter from water containing 10 mg/l to 14 mg/l (expressed in dissolved organic carbon), it is necessary to use 100 to 150 g/m$^3$ of powdered activated carbon.

This high consumption induces a production of additional sludges and very high corresponding costs of implementing the methods.

One way, known to those by skilled in the art, to reduce the consumption of activated carbon is to use two decanters in series: the first intended to eliminate suspended matter and turbidity and the second used to eliminate organic matter by the addition of powdered activated carbon which has the special feature of being permanently recirculated until saturation. Fresh active carbon is then injected into the second decanter to replace the used carbon which is extracted therefrom.

Such a method performs very well. Its drawback is that it requires the use of two decanters in series, thus inducing high investment costs.

There is a method known from FR2973794 for treating water by coagulation/flocculation, possibly ballasted coagulation/flocculation, in which a part of water clarified after coagulation and flocculation is put into contact with an adsorbent reagent powder upstream to the coagulation/flocculation process. Such a method saves on the reagents but requires a great quantity of activated carbon.

Finally, a method's known from the prior art, especially from EP1562867, which combines the addition of powdered activated carbon and filtration on membranes. Such a method has the drawback of high cost and difficulty of maintenance of the membranes.

GOALS OF THE INVENTION

The invention is aimed at proposing a physical/chemical method for treating water containing organic matter used to mitigate at least some of the drawbacks of the prior art mentioned here above.

In particular, it is a goal of the present invention to describe a method of this kind that entails a consumption of chemical reagents far smaller than that necessary in the prior-art methods referred to here above.

It is yet another goal of the present invention to disclose such a method which, in at least certain embodiments, implies the production of quantities of sludges far smaller than those produced in the prior-art methods referred to here above and, as a corollary, entails methods for treating these sludges that can be applied in far smaller installations.

It is yet another goal of the present invention to propose a method of this kind which, in at least certain embodiments, implies equal treatment capacity, for lower energy consumption than in the prior art.

It is yet another goal of the present invention to describe a method of this kind that can be used to obtain treated water, the corrosion index of which is far smaller than that of water treated in an acid medium according to the prior art, and which therefore causes less deterioration of the equipment through which it travels.

It is yet another goal of the present invention to propose a method of this kind that can be implemented on surface water that may be highly charged with suspended matter.

It is also a goal of the present invention to disclose a plant of this kind to implement such a method having, for equal treatment capacity, a ground footprint that is smaller than that of plants implementing the prior-art methods mentioned here above and entails lower costs.

SUMMARY OF THE INVENTION

These goals as well as others that shall appear here below are achieved by means of the invention which pertains to a method for treating water containing organic matter characterized in that it comprises:

a step of adsorption of the organic matter contained in said water in which this water is put into contact with an amagnetic ion-exchanging resin in at least one infinitely stirred tank;

the filtering of the mixture of water and resin within said tank and the discharging of filtered water from this tank, said filtering being implemented through at least one screen provided within said tank enabling said resin to be contained in said infinitely stirred tank;

the periodic cleansing of said at least one screen consisting of the separation, from this screen, of the saturated resin that has collected thereon;

the drawing off of saturated resin from said tank;

the regenerating of at least a part of said saturated resin thus drawn off;

the recycling of said resin thus regenerated in said tank;

a step of ballasted coagulation/flocculation and of separation comprising:

the addition of coagulant reagent, flocculent reagent and (microballast such as microsand) to the filtered water coming from said tank leading to the formation of flocs;

the separation of said formed flocs from clarified water;

the discharging of said clarified water; and the discharging of the sludges formed by the separated flocs.

In addition to the reduction of organic matter, the method also enables the reduction of the suspended matter content, the turbidity, the color and the algae content in the treated water when they contain them.

According to such a method, the state of adsorption consists in treating the water with an amagnetic ion-exchanging resin. During this step, the resins adsorb the organic substances and reject chloride ions in quantities proportional to the quantity of organic matter adsorbed (classically, a ratio of 4 to 5 ppm of chloride per ppm of eliminated TOC is thus seen). Gradually, this resin gets saturated.

The use of an infinitely stirred tank in the application of the method according to the invention gives a concentration of water in resin that is essentially constant at any point of the tank. Thus, according to the invention, there is no zone in the tank where water is not in contact with the resin except of course for zones of the tank it is downstream from the screen.

According to the invention, a part of the saturated resin is periodically or continually (preferably continually) drawn out, regenerated and recycled. In this context, the resin leakages are prevented, i.e. this resin is confined in the infinitely stirred tank. The step of filtration within this tank itself of the mixture of resin and water that it receives makes it possible to implement such a concentration while allowing the exit from the tank of water that is very essentially cleansed of organic matter. More specifically, the use of a screen, the meshes of which have a cut-off threshold below the mean grain size of the resin used, blocks the resin within the infinitely stirred tank. This operation also makes it possible to maintain an essentially constant concentration of resin in the tank.

The step of ballasted coagulation/flocculation and of separation consists in making the water, very essentially rid of organic matter, obtained at the exit from the infinitely stirred tank pass into a separator to which coagulant and flocculent reagents are conveyed in minimal quantities.

This step improves the reduction of organic matter and if necessary reduces turbidity, suspended matter content and color and eliminates algae that may be present in this water.

In practice, by using for example commercially available ferrous chloride ($FeCl_3$) as a coagulant reagent, the method according to the invention enables the implementation of this coagulant reagent at a rate of 10 $g/m^3$ and 50 $g/m^3$ of product according to the initial turbidity of the raw water to be treated to obtain treated water compliant with the quality standards for consumption water for the COD/COT parameter from raw water containing 10 mg/l and 14 mg/l of organic matter. Thus, the consumption of this reagent is very low as compared with the prior art which requires 170 $g/m^3$ and 220 $g/m^3$ of coagulant reagent ($FeCl_3$) for the same raw water. With regard to the flocculent reagent (polymer) its consumption can also be diminished. As a corollary, the quantity of sludges formed are smaller in quantities since the quantities of chemical reagents are minimized, inducing major savings on the operating cost of the method.

In addition, the fact that the flocculation is ballasted prevents resin fines if any from passing into the clarified water, these fines being trapped in the ballasted flocs.

The method according to the invention has the advantage of allowing a lowering of the performance level for organic matter elimination during the adsorption step by playing on the regeneration rate of resin while at the same time averting the need to increase the doses of chemical reagents distributed during the coagulation/flocculation and separation step.

According to one variant of the method according to the invention, the separation of said flocs is done by flotation. In such a case, a gas is injected into water coming from the infinitely stirred tank after the injection therein of a coagulant chemical reagent and a flocculent chemical reagent. This injection of gas prompts the flotation of the matter that remains to be eliminated in this water (residual organic matter, suspended matter, algae, turbidity) and eliminates its color. The clarified water is discharged at the lower part of the floater while the separated matter (sludges) are discharged at the upper part of this floater.

According to another variant of the method according to the invention, the separation of said flocs is done by settling, which may be lamellar or non-lamellar. In such a case, the clarified water is discharged at the upper part of the decanter while the treated water is discharged at the upper part of this decanter.

According to a preferred and particularly interesting aspect of the method according to the invention, the periodic cleansing of said at least one screen consists of the separation, from this screen, of the saturated resin that has accumulated therein comprising the injection of a fluid, chosen from the group constituted by pressurized water and compressed air, in a counter-current on said at least one screen. The sending of such a fluid in a counter-current to the screen detaches the saturated resin that has accumulated therein and thus unclogs this screen. This accumulated resin thus detached from the upstream surface of the screen can be extracted from the tank to be regenerated and then recycled in it. Such a filter enables the saturated resin to be concentrated in at least one circumscribed area on said at least one screen and thus facilitates the extraction from the tank and therefore the regeneration and then the recycling.

According to one very promising alternative embodiment of the invention, the regeneration of the saturated resin comprises the elution of the organic matter adsorbed on this resin by passage of an eluent on said resin and the recovery of an eluate, said eluate being fractioned into at least one fraction highly charged with organic matter and at least one fraction not highly charged with organic matter, said fraction highly charged with organic matter being discharged and said fraction not highly charged with organic matter being recycled as an eluent.

Such a method of regeneration of ion-exchanging resin enables savings on eluent as compared with the method of regeneration classically used in the prior art which consists in using all the eluent and periodically renewing it in its totality.

Preferably, the eluent is fractioned into several fractions and the content of each of these fractions in organic matter is measured or evaluated for example by measuring the UV absorbance of the eluate fraction. This divides the fractions into firstly fractions highly charged with organic matter, i.e. those having a parameter representing the concentration of organic matter exceeding a certain threshold and fractions not highly charged with organic matter, i.e. those having a parameter representing organic matter concentration below said threshold. Only the fractions that are not strongly charged in organic matter are recycled as eluent. This mode of regeneration of resin can especially rely on the use of an onstream measurement of UV absorbance on the eluate enabling a very precise choice to be made of the fractions of eluate to be eliminated as compared with a simple threshold level.

In practice, the elution profile shows an eluate that gets gradually charged with eluted matter and then its concentration of this matter gradually diminishes. The fractions recycled as eluents are the first and the last emitted.

It will be noted that such a method of resin regeneration could be applied in any type of method, especially for the treatment of water other than that according to the present invention.

It can be envisaged to use other types of resin to implement the step of adsorption of the method according to the invention. Preferably, an anionic amagnetic resin will be used.

Magnetized resins are used in the prior art (in the Myex® method) to favor their separation from treated water. The main defect of such resins lies in their very friable character which leads to major production of fines and an additional cost to keep the quantity of resin constant in the system by adding up fresh resin. Such a method requires additional decantation or sedimentation before the clarification step in order to remove the fines from the treated water. The resin losses are high.

In the framework of the present invention, the resin is confined in the tank and therefore does not have to be separated, for example by an intermediate complex and costly decanter.

The invention also pertains to a plant for the treatment of water for implementing the method described here above, characterized in that it comprises:

an infinitely stirred tank receiving an amagnetic ion-exchanging resin, said tank being provided with means for conveying raw water, means of stirring, at least one screen, means for extracting said resin, and means for discharging filtered water;

means for cleansing (17) said at least one screen;

means for regenerating said resin and means for recycling regenerated resin in said infinitely stirred tank;

at least one ballasted coagulation and flocculation reactor in fluid communication with said infinitely stirred tank;

means of separation in fluid communication with said at least one coagulation and flocculation reactor provided with means for discharging clarified water and means for discharging sludges.

According to one variant, said means of separation include a floater.

According to one variant, said means of separation include a decanter equipped or not equipped with blades.

Preferably, said screen has a cut-off threshold ranging from 40 m to 120 m. This cut-off threshold makes it possible to contain, in the infinitely stirred tank, resins that can be used, preferably in the method.

Preferably, said screen, is made out of food-safe plastic material and preferably, amongst all materials, it is made out of porous high-density polyethylene (HDPE).

Also advantageously, said resin is an anionic amagnetic resin.

Preferably, said means for regenerating a resin comprise a regeneration tank, means for conveying eluent and means for separating the eluent into fractions.

Also preferably the means for cleansing said at least one screen include means of distribution of a fluid chosen from among pressurized water and compressed air on said at least one screen.

Advantageously, said means for extracting resin include at least one resin recovery unit provided in the infinitely stirred tank in proximity to said at least one screen.

It will be noted that such characteristics for the regeneration of resin could be applied in any type of installation, especially for water treatment, in which regeneration of resin can be envisaged.

LIST OF FIGURES

The invention as well as its different advantages will be more easily understood from the description of an embodiment of the installation and the method according to the invention, given by way of non-restrictive examples and with reference to the figures, of which:

DESCRIPTION OF EMBODIMENTS OF THE INVENTION

Plant

Figure 1:
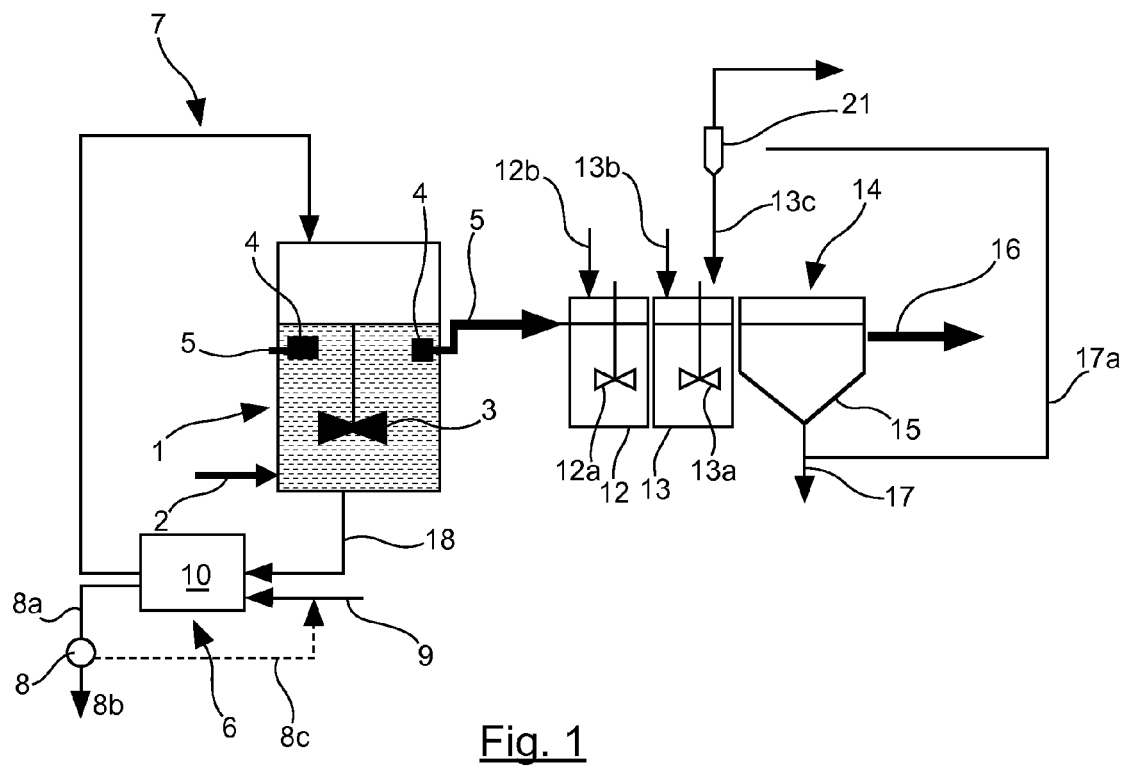
FIG. 1 is a schematic representation of an example of an embodiment of a plant according to the invention for implementing the method according to the invention.
Figure 2:
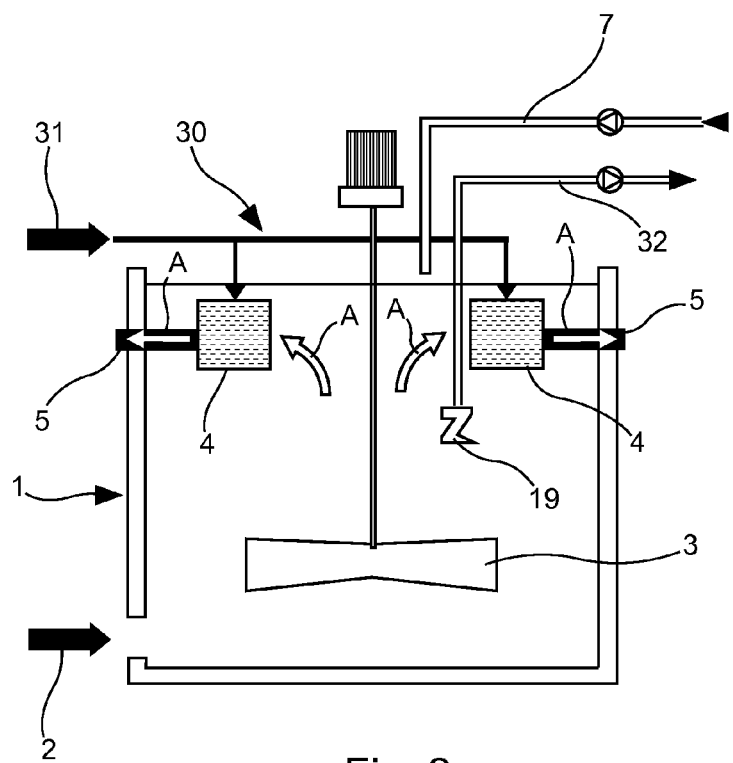
FIG. 2 is a schematic representation of an infinitely stirred tank provided with means for regenerating resin and means for recycling regenerated resin in said tank that can be implemented in the framework of the invention.

Referring to FIG. 1 and FIG. 2, the plant according to the invention schematically represented comprises an infinitely stirred tank 1. This tank 1 is provided with means 2 for conveying raw water provided in the lower part and means 5 for discharging filtered water provided in the upper part. It is also equipped with stirring means 3 comprising a blade-fitted stirrer moved by a motor. In other embodiments, these stirring means could be constituted by other types of stirring means, especially a device as described in the patent application FR2971436.

In accordance with the present invention, the tank 1 is provided with one or more screens 4, which shall be described in detail here below with reference to FIG. 3. These screens in the present embodiment are provided in the upper part of the tank 1. However, in other embodiments they could be provided in any other part of the tank, the important point being that they can be submerged by the mixture of water and resin received by the infinitely stirred tank 1. This mixture is shaded in FIG. 1.

Finally, the infinitely stirred tank 1 is also provided with means for extracting resin 18.

As can be seen in FIG. 2, and according to the present invention, the plant also comprises means 30 for cleansing the screens 4. These cleansing means 30 include a conduit 31 of compressed air flowing in a counter flow to the sense of filtration of the mixture of resin and water by the screens. This sense of filtration is symbolized by the arrow A in FIG. 2.

Also in compliance with the present invention, the means for extracting resin 18 include a recovery unit 19 designed to recover the essential part of the matter detached from the screens 4 through the means 30 for cleansing these screens. This recovery unit 19 is connected to a pipe 32 provided with a pump which extracts this matter to convey it towards the resin regeneration means 6.

The plant indeed also comprises such resin regeneration means 6 in fluid communication with the infinitely stirred tank 1. These resin regeneration means 6 include a regeneration tank 10, means 9 for conveying eluent to said regeneration tank and means 8 for separating the eluent into fractions. A common pipe 8a conveys the totality of the eluate coming from the regeneration 10 towards the separating means 8, and a pipe 8c is dedicated to the recycling of eluate fractions meagerly charged with organic matter, as eluent towards the eluent conveying means 9 while a pipe 8b is dedicated to discharging fractions of eluate more highly charged with organic matter and non-reusable as eluent.

The plant also comprises means 7b for recycling regenerated resin through the resin regeneration means 6. These recycling means include a pipe connecting the lower part of the regeneration tank 10 to the infinitely stirred tank 1 and enable the re-routing of the regenerated resin into the tank 10.

The plant also includes a coagulation reactor 12 in fluid communication with the means 5 for discharging filtered water into the infinitely stirred tank. This reactor 12 is provided with the blade-fitted stirrer 12a and means 12b for distributing coagulating reagent.

The plant also includes a flocculation reactor 12 in fluid communication with said coagulation reactor 12. This reactor 13 is provided with a blade-fitted stirrer 13a, means for distributing coagulant reagent 13b and means for distributing a ballast intended to increase the density of the flocs and therefore to facilitate the subsequent separation by decantation.

Finally, the plant comprises separation means 14 comprising means 16 for discharging clarified water and means 17 for discharging sludges. In the present embodiment, these separation means include a decanter 15 provided with inclined blades (not shown) helping in the decantation process. The sludge discharging means 17 include a pipe 17a for transferring a part of these sludges to a hydrocyclone 21, the underflow of which communicates with the ballast distribution means 20 and the overflow of which discharges dirty water. These means recycle the ballast and therefore reduce its consumption.

Figure 3:
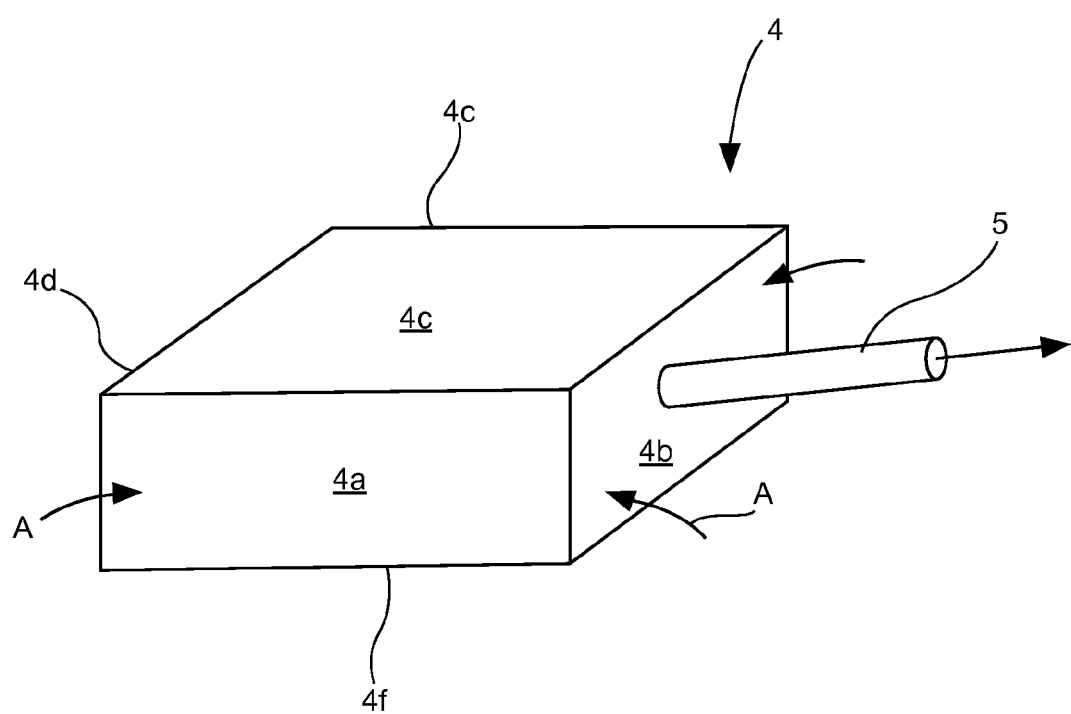
FIG. 3 represents a schematic view in perspective of one embodiment of a screen that can be implemented in a plant according to the present invention.

Referring to FIG. 3, the screens 4 are constituted in the form of a box, the side walls 4a, 4b, 4c, 4d, 4e and the bottom 4f of which are constituted by thick plates, 3 to 10 mm, made of porous PEHD, the pores of which have a cut-off threshold of 40 μm to 120 μm. The mixture of resin and water present in the infinitely stirred tank is filtered as symbolized by the arrows A in the sense going from outside the "box" to its interior. The means for discharging filtered water communicate with this interior.

Method

The plant described here is implemented to treat water having an organic matter content expressed in TOC (total organic carbon) of about 2.5 to 5 mg C/L and the turbidity varies from 1 to 50 NTU.

As a coagulant reagent, ferrous chloride $FeCl_3$ was used.

As a flocculent reagent, an AN 934 type anionic polymer was used.

As ballast, micro-sand was used.

The resin used was an amagnetic anionic resin commercially distributed as Purolite.

The water was treated in the plant at a flow rate of 3 $m^3$/h, and the volume of water treated corresponded to 24 $m^3$/day.

The concentration of resin in the water within the infinitely stirred tank was fixed and maintained in the range of 100 to 200 ml of resin/L typically 150 ml of resin/L.

A speed of clarification in the settling tank of 60 m/h was implemented.

For the regeneration of the resin, brine, (120 to 300 g NaCl/l) was used as eluent. The eluate was fractioned into several fractions. The fractions having an organic matter concentration above a predetermined threshold were discharged while the fractions having a concentration below this threshold were reutilized as eluent. This method enabled savings in brine.

The recycling of regenerated resin was implemented so as to observe a resin renewal rate within the infinitely stirred tank of 2 to 4 ml of resin/L.

The water obtained at the exit from the plant had an organic matter content expressed in TOC of 1 mg C/L and a turbidity in NTU below 1.

To obtain this excellent result, only 10 $g/m^3$ of $FeCl_3$ and only 0.2 $g/m^3$ of flocculent polymer was used. Almost the entire portion of ballast (micro-sand) was also recycled.

Table 1 gives a synthetic view of the costs entailed in the implementation of the method according to the invention and two prior-art techniques to process one cubic meter of the same water in order to obtain treated water of similar quality.

These results confirm the advantage of the present invention over the prior art in terms of economy of chemical reagents, the invention permitting savings of about 50% to 75% in the total cost of reagents used.

Finally, it will be noted that the invention has the advantage of removing the need for using magnetized resins and therefore for producing resin fines.

| Reagent | Reagent prices Price) | FR2973794 Dose (g/m3) | FR2973794 Price (€/m3) | EP162867 Dose (g/m3) | EP162867 Price (€/m3) | INVENTION Dose (g/m3) | INVENTION Price (€/m3) with regeneration of resin 2 mL/L | INVENTION Price (€/m3) with regeneration of resin 4 mL/ |
|---|---|---|---|---|---|---|---|---|
| Added resin (€/L) | 4 | | | | | 0.1 | 0.01 | 0.01 |
| Brine (NaCl) | 100 €/ton | | | | | | 0.015 | 0.03 |
| Cost of electricity needed at the resin regeneration step (€) | | | | | | | 0,0002 | 0.0004 |
| FeCl3 | 150 €/ton | 10 | 0.0015 | | | 10 | 0.0015 | 0.0015 |
| Carbon active powder | 2500 €/ton | 20 | 0.0500 | 30 | 0.075 | | | |
| Polymer | 2000 €/ton | 0.5 | 0.001 | | | 0.2 | 0.0004 | 0.0004 |
| Sand | 150 €/ton | 5 | 0.00075 | | | 5 | 0.00075 | 0.00075 |
| Citric acid | 1000 €/ton | | | | 0.0006 | | | |
| Bleach | | | | | 0.001 | | | |
| Total treated water in €/m3 | | | 0.053 | | 0.077 | | 0.028 | 0.043 |

The invention claimed is:

1. A method for treating water containing organic matter comprising:
    contacting the organic matter contained in the water with an amagnetic ion exchange resin in a stirred tank and adsorbing the organic matter onto the resin;
    filtering the mixture of water and resin within the tank and discharging the filtered water from the tank;
    said filtering being implemented through at least one screen in the tank and wherein the filtering of the water in the tank is such that the resin is contained within the tank and some used resin is collected on the screen;
    periodically cleaning the at least one screen and separating from the screen used resin that is collected on the screen;
    removing the used resin from the tank;
    regenerating at least a portion of the used resin removed from the tank;
    recycling at least a portion of the regenerated resin to the tank;
    directing the filtered water to a downstream ballasted flocculation and separation system;
    in the ballasted flocculation and separation system, adding a coagulant reagent, a flocculant reagent and a microballast to the filtered water which causes the formation of flocs;
    separating the formed flocs from a clarified water;
    discharging the clarified water from the ballast flocculation and separation system; and
    wherein the flocs form a part of sludge and the method includes discharging the sludge from the ballasted flocculation and separation system.

2. The method of claim 1 wherein cleaning the screen includes injecting a fluid into and through the screen where the injected fluid flows in a direction generally counter to the direction of flow of the filtered water.

3. The method of claim 1 wherein the regeneration of the used resin comprises the elution of the organic matter adsorbed on this resin by passage of an eluent on said resin and the recovery of an eluate, said eluate being fractioned into at least one fraction highly charged with organic matter and at least one fraction not highly charged with organic matter, said fraction highly charged with organic matter being discharged and said fraction not highly charged with organic matter being recycled as an eluent.

4. The method according to claim 1, characterized in that the separation of said flocs is done by flotation.

5. The method according to claim 1, characterized in that the separation of said flocs is done by lamellar or non-lamellar decantation.

6. The method according to claim 1, characterized in that said resin is an anionic resin.

7. The method of claim 1 further including maintaining the concentration of resin in the water in the tank in the range of 100-200 ml of resin per liter of water.

8. The method of claim 1 wherein regenerating the resin includes employing a brine as an eluent.

9. The method of claim 8 wherein the eluent is NaCl.

10. The method of claim 1 wherein recycling the regenerated resin includes providing a resin renewal rate in the tank of 2-4 ml of resin per liter of water.

11. The method of claim 1 wherein organic matter and suspended solids are removed from the water through the processes in the tank and the ballasted flocculation and separation system such that the clarified water leaving the ballasted flocculation and separation system includes an organic matter content expressed in TOC of 1 mgC/L and a turbidity in NTU below 1.

* * * * *